(12) United States Patent
Thomas et al.

(10) Patent No.: US 10,156,151 B2
(45) Date of Patent: Dec. 18, 2018

(54) COMPOSITE ANNULUS FILLER

(71) Applicants: Rolls-Royce Corporation, Indianapolis, IN (US); Rolls-Royce North American Technologies, Inc., Indianapolis, IN (US)

(72) Inventors: David J. Thomas, Brownsburg, IN (US); Ted J. Freeman, Danville, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 572 days.

(21) Appl. No.: 14/869,432

(22) Filed: Sep. 29, 2015

(65) Prior Publication Data

US 2016/0115794 A1  Apr. 28, 2016

Related U.S. Application Data

(60) Provisional application No. 62/067,607, filed on Oct. 23, 2014.

(51) Int. Cl.
| | | |
|---|---|---|
| *F01D 11/00* | (2006.01) | |
| *B29C 70/48* | (2006.01) | |
| *B29C 70/22* | (2006.01) | |
| *B29L 31/08* | (2006.01) | |
| *F01D 5/06* | (2006.01) | |

(52) U.S. Cl.
CPC ......... *F01D 11/008* (2013.01); *B29C 70/222* (2013.01); *B29C 70/48* (2013.01); *B29L 2031/08* (2013.01); *F01D 5/066* (2013.01)

(58) Field of Classification Search
CPC .................................................... F01D 11/008
See application file for complete search history.

(56) References Cited

U.S. PATENT DOCUMENTS

| | | |
|---|---|---|
| 3,712,757 A | 1/1973 | Goodwin |
| 4,174,912 A | 11/1979 | Peterson |
| 4,655,687 A | 4/1987 | Atkinson et al. |
| 4,659,289 A | 4/1987 | Kalogeros et al. |
| 4,802,824 A | 2/1989 | Gastebois et al. |
| 5,161,949 A | 11/1992 | Brioude et al. |
| 5,222,865 A | 6/1993 | Corsmeier |
| 5,464,326 A | 11/1995 | Knott |
| 5,890,874 A | 4/1999 | Lambert et al. |

(Continued)

FOREIGN PATENT DOCUMENTS

EP          2511480 A2    10/2012

OTHER PUBLICATIONS

Extended European Search Report, dated Mar. 7, 2016, for European Application No. 15188469.9-1703, 5 pages.

*Primary Examiner* — Woody Lee, Jr.
(74) *Attorney, Agent, or Firm* — Barnes & Thornburg LLP

(57) ABSTRACT

A composite annulus filler adapted to bridge the gap between two adjacent rotor blades attached to a rim of a rotor disc of a gas turbine engine. The annulus filler includes a unitary body portion having a platform which extends between the adjacent rotor blades and defines an airflow surface for air being drawn through the engine and a support body extending beneath the platform and terminating in a root which, in use, extends along a groove provided in the rim of the rotor disc.

15 Claims, 4 Drawing Sheets

(56) References Cited

U.S. PATENT DOCUMENTS

| | | | |
|---|---|---|---|
| 6,217,283 B1* | 4/2001 | Ravenhall | F01D 5/225 415/9 |
| 6,312,224 B1* | 11/2001 | Knott | F01D 5/143 416/229 A |
| 6,514,045 B1 | 2/2003 | Barton et al. | |
| 6,726,452 B2 | 4/2004 | Strassberger et al. | |
| 7,094,021 B2 | 8/2006 | Haubert | |
| 7,153,099 B2 | 12/2006 | Queriault et al. | |
| 7,527,476 B2 | 5/2009 | Butt et al. | |
| 7,762,781 B1 | 7/2010 | Brown et al. | |
| 7,931,442 B1* | 4/2011 | Liang | F01D 5/3007 416/193 A |
| 7,942,636 B2 | 5/2011 | Evans | |
| 8,066,479 B2 | 11/2011 | El-Aini et al. | |
| 8,292,586 B2 | 10/2012 | Bottome | |
| 8,297,931 B2 | 10/2012 | Read et al. | |
| 8,425,192 B2 | 4/2013 | Hoyland et al. | |
| 9,228,444 B2* | 1/2016 | Evans | F01D 5/225 |
| 2011/0110780 A1 | 5/2011 | Hoyland et al. | |
| 2012/0263596 A1 | 10/2012 | Evans et al. | |
| 2012/0266603 A1* | 10/2012 | Uskert | B32B 5/18 60/772 |
| 2012/0301317 A1* | 11/2012 | Alvanos | F01D 5/147 416/241 B |
| 2014/0212292 A1* | 7/2014 | Xu | F01D 5/30 416/193 A |
| 2014/0363299 A1* | 12/2014 | Marchal | B29C 70/24 416/193 A |
| 2015/0247414 A1* | 9/2015 | Uskert | F01D 5/282 416/190 |
| 2016/0376920 A1* | 12/2016 | Luczak | F01D 5/26 416/1 |

* cited by examiner

COMPOSITE ANNULUS FILLER

CROSS REFERENCE TO RELATED APPLICATIONS

This application claims priority to and the benefit of U.S. Provisional Patent Application No. 62/067,607, filed 23 Oct. 2014, the disclosure of which is now expressly incorporated herein by reference.

FIELD OF THE DISCLOSURE

The present invention relates to a composite annulus filler used to bridge the gap between adjacent blades of a gas turbine engine.

BACKGROUND

Gas turbine engines are used to power aircraft, watercraft, power generators, pumps and the like. Turbofan gas turbine engines typically include a fan, a compressor, a combustor, and a turbine. Conventionally, rotor stages included in such engines comprise a plurality of radially extending blades mounted on a disc. The blades are mounted on the disc by inserting a root portion of the blade in a complementary retention groove in the outer face of a disc periphery.

In some engines, to ensure a radially smooth inner surface for air to flow over as it passes through a rotor stage, annulus fillers can be used to bridge the spaces between adjacent fan blades. The annulus fillers may be manufactured from relatively lightweight materials and, in the event of damage, may be replaced independently of the blades.

SUMMARY

The present disclosure may comprise one or more of the following features and combinations thereof.

According to one aspect of the present disclosure, a composite annulus filler for bridging the gap between two adjacent rotor blades is taught. The composite annulus filler is adapted to be attached to a rim of a rotor disc of a gas turbine engine. The composite annulus filler may include a platform which extends between the adjacent blades and defines an airflow surface for air being drawn through the engine and a support body extending beneath the platform and terminating in a root. The root, in use, extends along a groove provided in the rim of the rotor disc. The groove may have a neck which prevents withdrawal of the filler root through the neck in a radially outward direction of the disc.

In some embodiments, the platform, support body and root may be unitarily formed as a three dimensional braided structure that comprises the platform, the support body and the root. The three dimensional braided structure may be infused with a matrix to form the composite annulus filler.

In some embodiments, the braid structure may be formed from silicon-carbide threads. The matrix may be a silicon-carbide ceramic composite.

In some embodiments, the platform may include a top side and first and second spaced apart longitudinal edges. One of the longitudinal edges of the platform may include a machined feature. The machined feature may be a hemispherical recess formed in the longitudinal edge of the platform.

In some embodiments, the support body may include first and second side walls that extend from the platform to the root. A cavity may be formed between the first and second side walls. The three dimensional braided structure may form an axially extending tube arranged around the cavity without axially extending seams.

According to another aspect of the present disclosure a composite annulus filler may include a platform, a support body extending beneath the platform, and a root extending beneath the support body. The platform, support body and root may be unitary.

In some embodiments, the platform, support body and root may be formed as a three dimensional woven structure. The three dimensional woven structure may be infused with a ceramic-containing matrix to form a ceramic matrix composite.

In some embodiments, the woven structure is formed from silicon-carbide threads. The platform of the unitary body may include a top side and first and second spaced apart longitudinal edges. One of the longitudinal edges of the platform may include a machined feature. The machined feature may be a hemispherical recess formed in the longitudinal edge of the platform portion.

In some embodiments, the support body may include first and second side walls that extend from the platform to the filler root. A cavity may be defined by the platform, the first side wall, and the second side wall.

In some embodiments, the three dimensional woven structure may form an axially extending tube. The axially extending tube may be arranged around the cavity and the tube may not include axially extending seams.

According to another aspect of the present disclosure, a method for forming a composite annulus filler is disclosed. The method may include three dimensionally braiding a unitary annulus filler preform. The preform may have a platform, a support body extending beneath the platform, and a root extending beneath the support body. The platform may have first and second longitudinal edges.

In some embodiments, the method may include placing the unitary annulus filler preform into a transfer mold. The method may include applying a composite matrix material to the unitary annulus filler preform to form the composite annulus filler. The method may include machining features into one of the first or second longitudinal edges of the platform of the composite annulus filler.

In some embodiments, the unitary annulus filler preform may be braided from silicon-carbide fibers and the composite matrix material may contain silicon-carbide and ceramic. The support body may include first and second side walls that extend from the platform portion to the root to form a cavity. The three dimensional braided structure may form an axially extending tube arranged around the cavity. The tube may not include axially extending seams.

These and other features of the present disclosure will become more apparent from the following description of the illustrative embodiments.

BRIEF DESCRIPTION OF THE DRAWINGS

Embodiments of the invention will now be described by way of example with reference to the accompanying drawings in which.

DETAILED DESCRIPTION OF THE DRAWINGS

Figure 1:
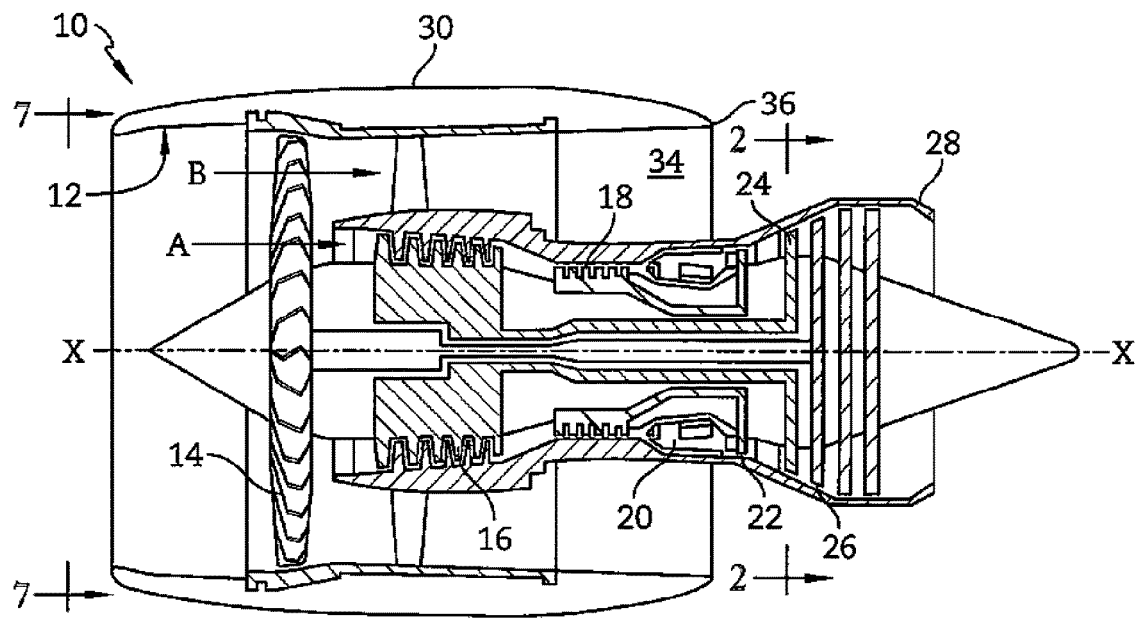
FIG. 1 is a longitudinal sectional view through a ducted turbofan gas turbine engine.

For the purposes of promoting an understanding of the principles of the disclosure, reference will now be made to a number of illustrative embodiments illustrated in the drawings and specific language will be used to describe the same.

With reference to FIG. 1, a ducted turbofan gas turbine engine generally indicated at 10 has a principal and rotational axis X-X. The engine comprises, in axial flow series, an air intake 12, a propulsive fan 14, an intermediate pressure compressor 16, a high-pressure compressor 18, combustion equipment 20, a high-pressure turbine 22, and intermediate pressure turbine 24, a low-pressure turbine 26 and a core engine exhaust nozzle 28. A housing 30 generally surrounds the engine 10 and defines the intake 12, a bypass duct 34 and a bypass exhaust 36.

The gas turbine engine 10 is configured so that air entering the intake 12 is accelerated by the fan 14 to produce two air flows: a first air flow A into the intermediate pressure compressor 16 and a second air flow B which passes through the bypass duct 34 to provide propulsive thrust. The intermediate pressure compressor 16 compresses the air flow A directed into it before delivering that air to the high pressure compressor 18 where further compression takes place.

The compressed air exhausted from the high-pressure compressor 18 is directed into the combustion equipment 20 where it is mixed with fuel and the mixture combusted. The resultant hot combustion products then expand through, and thereby drive the high, intermediate and low-pressure turbines 22, 24, 26 before being exhausted through the nozzle 28 to provide additional propulsive thrust. The high, intermediate and low-pressure turbines 22, 24, 26 respectively drive the high and intermediate pressure compressors 18, 16 and the fan 14 by suitable interconnecting shafts.

Figure 2:
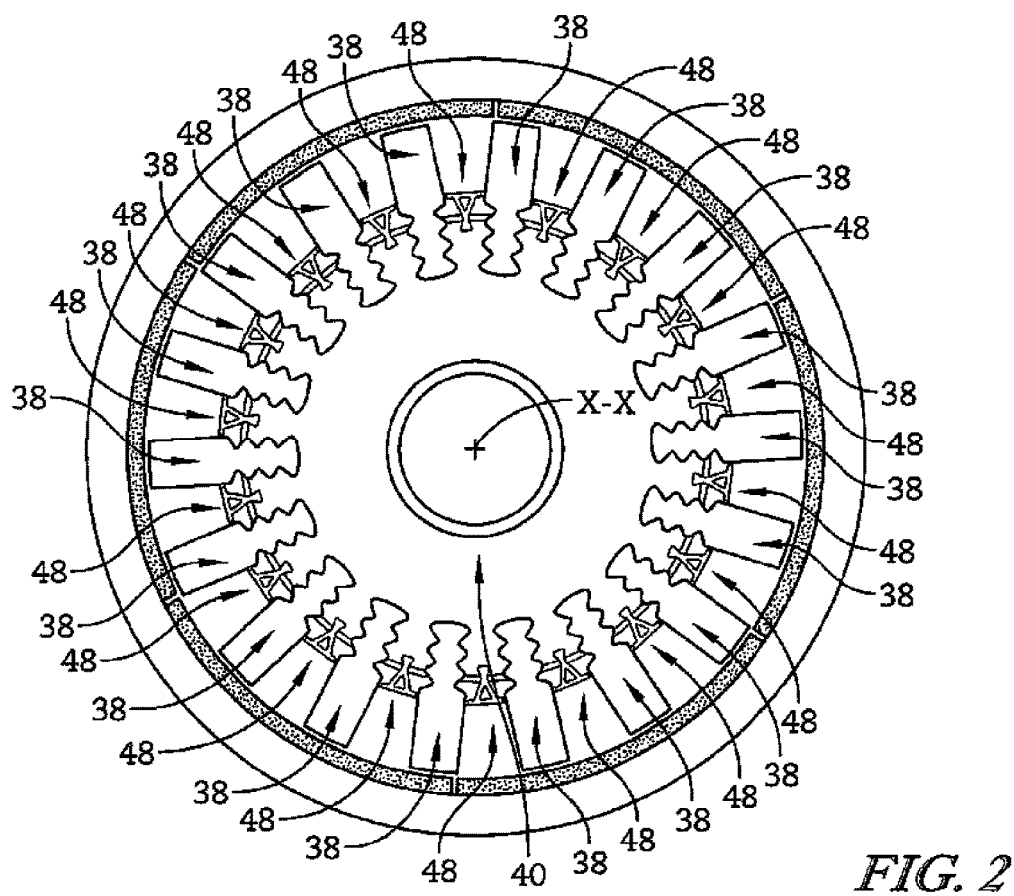
FIG. 2 is an end view of a turbine rotor included in the turbine engine taken along line 2-2 FIG. 1.
Figure 3:
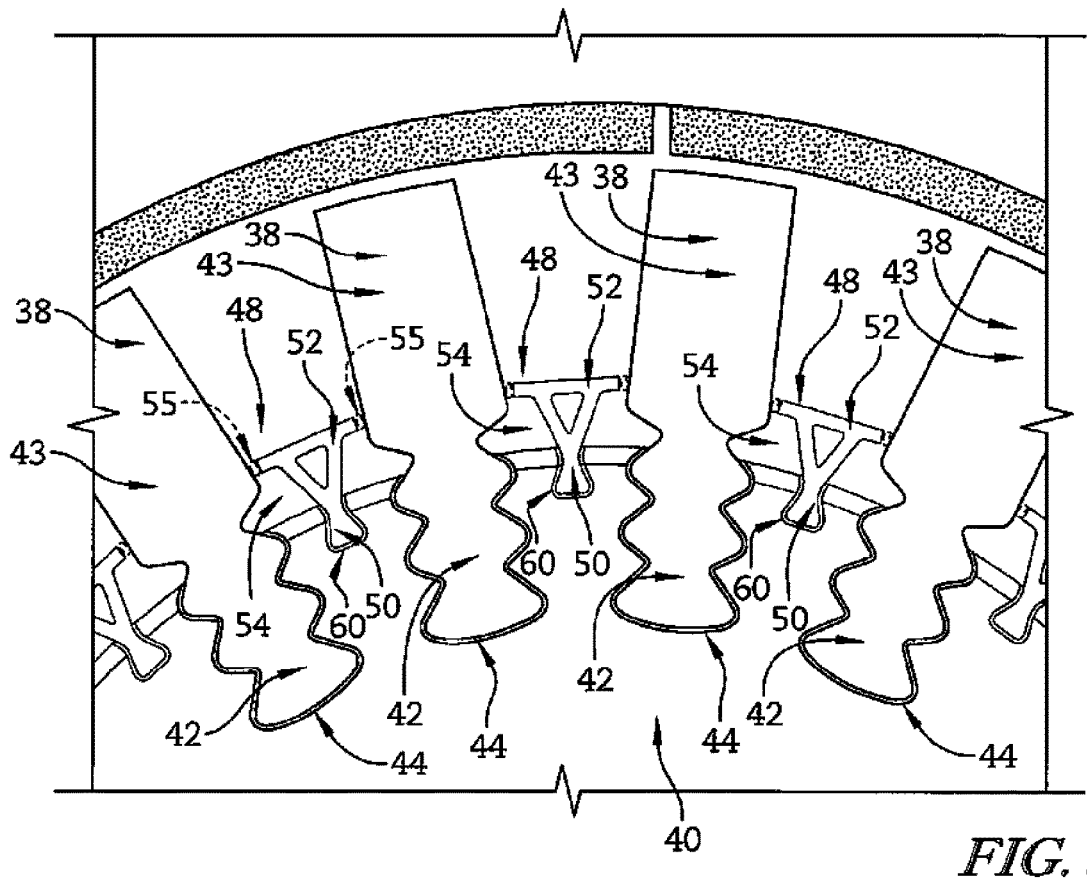
FIG. 3 is detail view of portion of the turbine rotor of FIG. 2 showing composite annulus fillers positioned between turbine blades included in the turbine rotor of FIG. 2.

A turbine rotor illustratively comprises a plurality of radially extending blades 38 mounted on a disc 40, as shown in FIGS. 2 and 3. The blades 38 are mounted on the disc 40 by inserting a root portion 42 of the blade 28 in a complementary retention groove 44 in the outer face 46 of the disc periphery while an airfoil portion 43 extends into a gas path 45 of the engine. To ensure a radially smooth inner surface for air to flow over as it passes across airfoil portions 43 of the blades 38, annulus fillers 48 can be used to bridge the spaces between adjacent blades 38. A seal between the annulus fillers 48 and the adjacent blades 38 may also provided by resilient strips 55 bonded to the annulus fillers 48 adjacent the blades 38. The annulus fillers 48 may be manufactured from relatively lightweight materials and, in the event of damage, may be replaced independently of the blades 38.

Annulus fillers 48 may include features to allow them to be removably attached to the rotor disc 40, as shown in FIG. 3. Particularly, each annulus filler 48 may be provided with a filler root 50 for attaching the annulus filler 48 to the rotor disc 40. The filler root 50 is adapted to engage with groove 60 of the rotor disc 40. Groove 60 includes necked in region 61 to retain filler root 50. The annulus filler 48 slides axially backwards over the rotor disc 40 following an arc which matches the chord-wise curvatures of the airfoil surfaces of the adjacent blades 38. The annulus filler 48 may be axially retained in place by a front attachment disc (not shown) which is fastened over all of the annulus fillers 48 located around the rotor disc 40.

Figure 4:
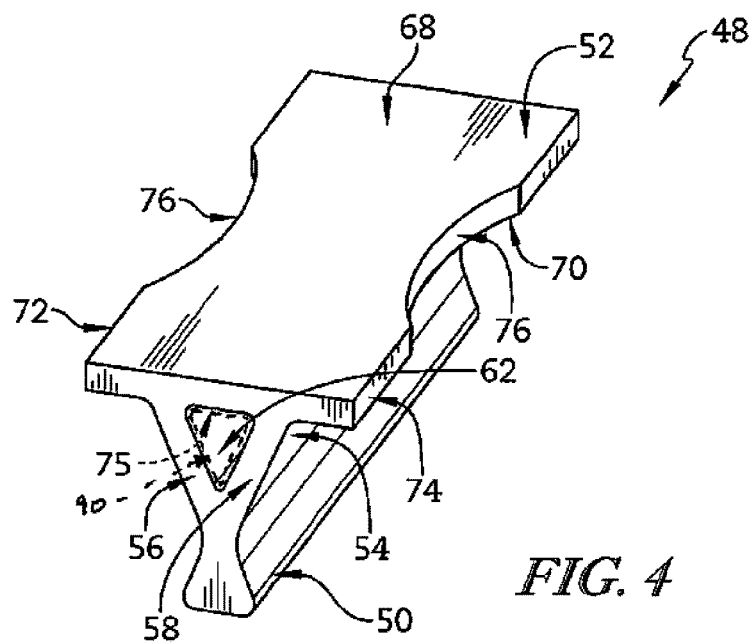
FIG. 4 is a perspective view of a composite annulus filler showing a platform which defines an airflow surface and a support body that extends from the platform.

FIG. 4 illustrates a perspective view of an annulus filler 48 according to an embodiment of the present disclosure. Annulus filler 48 includes a platform 52 which, in use, extends between two adjacent blades 38 to block air from moving radially inwardly toward the root portions 42 of the blades 38. Annulus filler 48 also includes a support body 54 extending radially inward from the platform 52 and terminating at the filler root 50. Support body 54 is formed by two side walls 56, 58 which join to the platform 52 and meet at the filler root 50 to provide the support body 54 with a V-shaped cross-section. Filler root 50 of the illustrative embodiment has a dovetail cross-sectional shape but in other embodiments may have a fir tree or other cross-sectional shape.

Platform 52 and side walls 56, 58 cooperate to define an internal cavity 62 as shown in FIG. 4. In some embodiments, the cavity 62 formed by platform 52 and side walls 56, 58 can be filled with a core 75, which provides a lightweight resilient support to the platform 52 and side walls 56, 58. Such support can absorb impact energy and help platform 52 and side walls 56, 58 retain their shape after impact deformation. The core 75 may be made from foam or other suitable materials injected into the cavity 62.

Platform 52 of annulus filler 48 includes a top side 68, a bottom side 70 and first and second spaced apart longitudinal edges 72, 74 as shown in FIG. 4. Longitudinal edges 72, 74 of platform 52 include at least one a machined feature 76. Machined feature 76, in one embodiment, is in the shape of a hemispherical recess formed in the longitudinal edges 72, 74 of platform 52.

In the illustrative embodiment, the filler root 50 and groove 60 retention system can distribute loads over the entire axial length of annulus filler 48. This arrangement allows the use of a lightweight annulus filler 48 which can improve engine efficiency. The weight of annulus filler 48 can be reduced, for example, by forming platform 52, side walls 56, 58 and filler root 50 from composite materials as a unitary structure.

Figure 5:
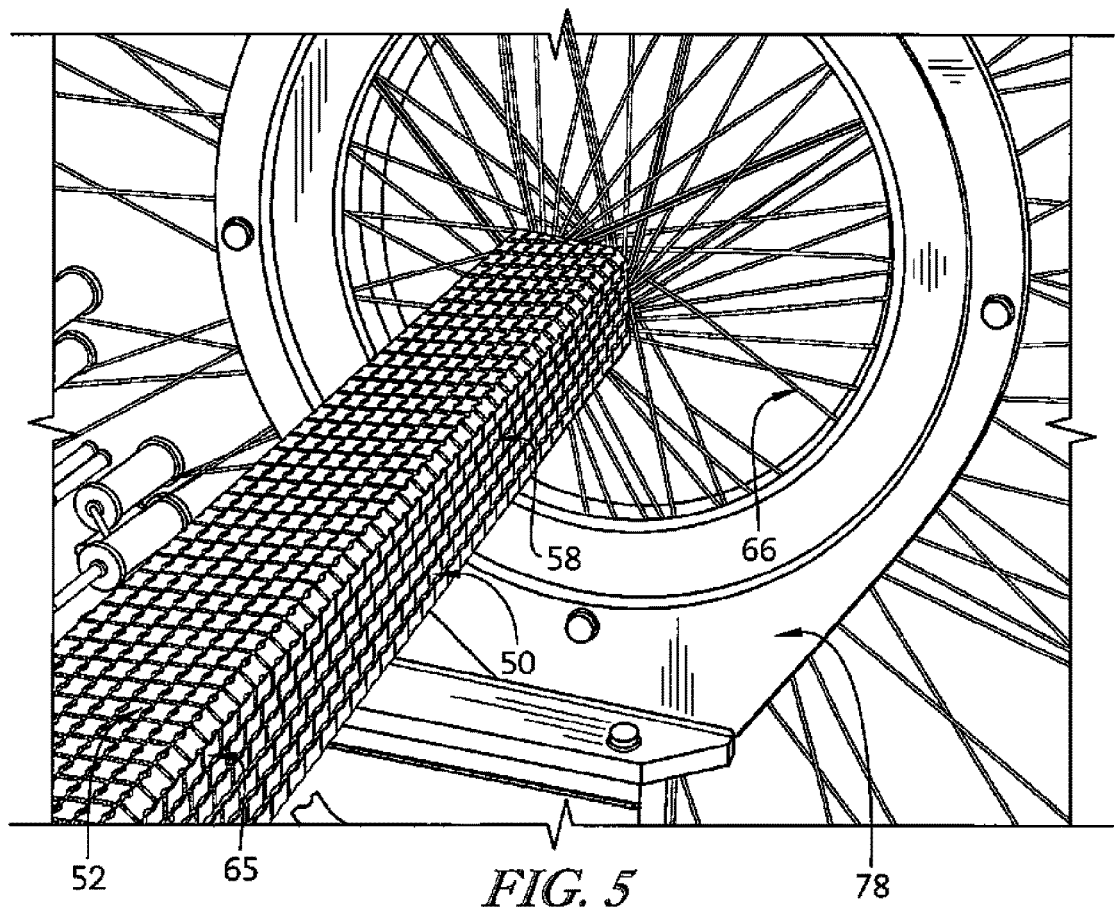
FIG. 5 is a perspective view of an example of a three-dimensional (3D) braiding process for braiding reinforcement fibers of the composite annulus filler.
Figure 6:
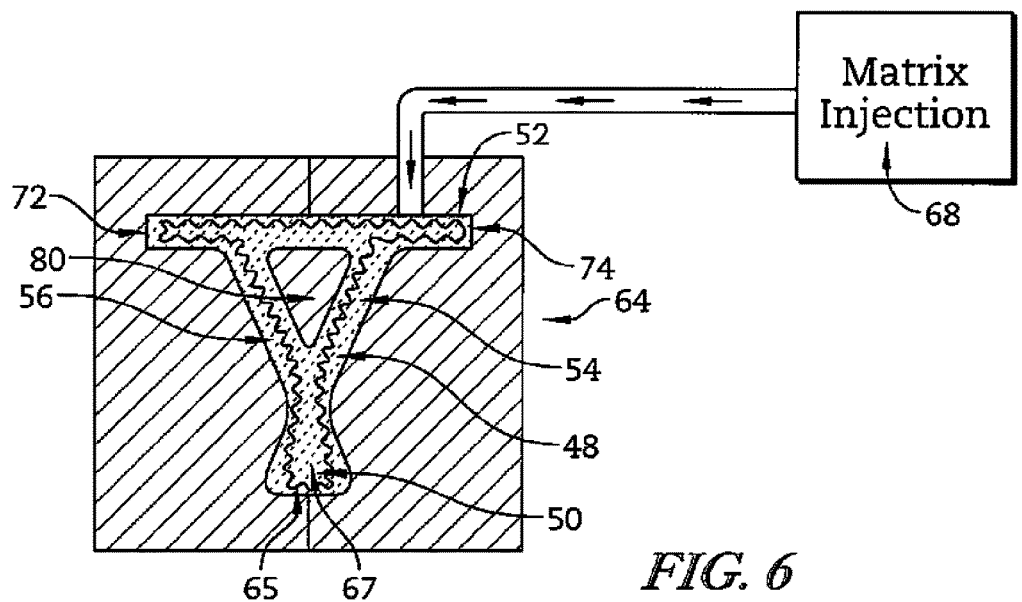
FIG. 6 is a sectional view of a mold cavity used to infuse braided reinforcement fibers of the annulus filler with a matrix to form the composite annulus filler.

Platform 52, side walls 56, 58 and filler root 50 are illustratively formed as a unitary structure using an automated 3D braiding process to intertwine reinforcing fibers 65 of the annulus filler 48 as suggested in FIGS. 5 and 6. Alternatively, a 3D weaving process can also be used to intertwine reinforcing fibers 65 of the annulus filler 48. The braided reinforcing fibers 65 form an axially extending tube arranged around the cavity 62 without axially extending seams.

More specifically, in the illustrative embodiment, the basic preform structure of reinforcing fibers 65 included in the annulus filler 48 is formed by 3D braiding or 3D weaving silicon-carbide fibers, which are combined with a silicon-carbide matrix material 67 to form a silicon-carbide or a silicon-carbide ceramic matrix composite structure, as shown, for example, in FIGS. 5 and 6. In other embodiments, other ceramic matrix composites or other composites adapted to withstand turbine temperatures may also be used. Ceramic matrix composites (CMCs) are a subgroup of composite materials as well as a subgroup of technical ceramics. CMCs may consist of reinforcing fibers embedded in a ceramic-containing matrix, thus forming a fiber reinforced ceramic material. The fibers can consist of ceramic and/or other suitable materials.

3D braiding or 3D weaving equipment is made by companies such as 3Tex Incorporated. Several braiding techniques can be used to braid reinforcing fibers 65 of annulus filler 48 including row and column braiding and two step braiding. The braiding equipment 78 shown in FIG. 5 is for illustrative purposes and provides an example of a type of 3D braider. The matrix composition can be infused into the braided structure (preform) by chemical vapor infiltration (CVI) or chemical vapor deposition (CVD). Silicon-carbide ceramic composite material 68 is infused into the braided preform to fill voids between braid fibers 65 and to form composite annulus filler 48. In other embodiments, other infusion methods such as resin transfer molding may be used.

An optional core 90 may foamed in situ in the cavity 62 in some embodiments as suggested in FIG. 3. The core 90 may include chopped ceramic-containing fibers suspended in ceramic-containing matrix such that the core 90 is a ceramic-matrix composite component. The core 90 may be co-processed with the annulus filler preform such that the core 90 is bonded to the annulus filler preform and, in some embodiments, densified therewith.

A more sophisticated 3D braided or woven structure can be made to provide optional internal struts or lattice within the cavity 62. In some such embodiments, more than one former may be required during molding.

Figure 7:
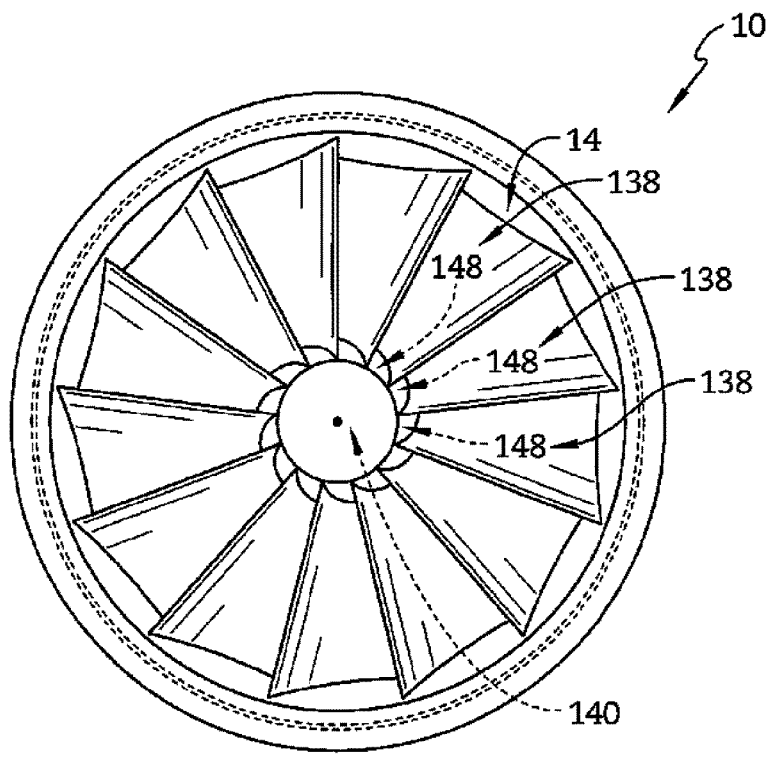
FIG. 7 is an end view of a fan included in the turbine engine taken along line 7-7 of FIG. 1.
Figure 8:
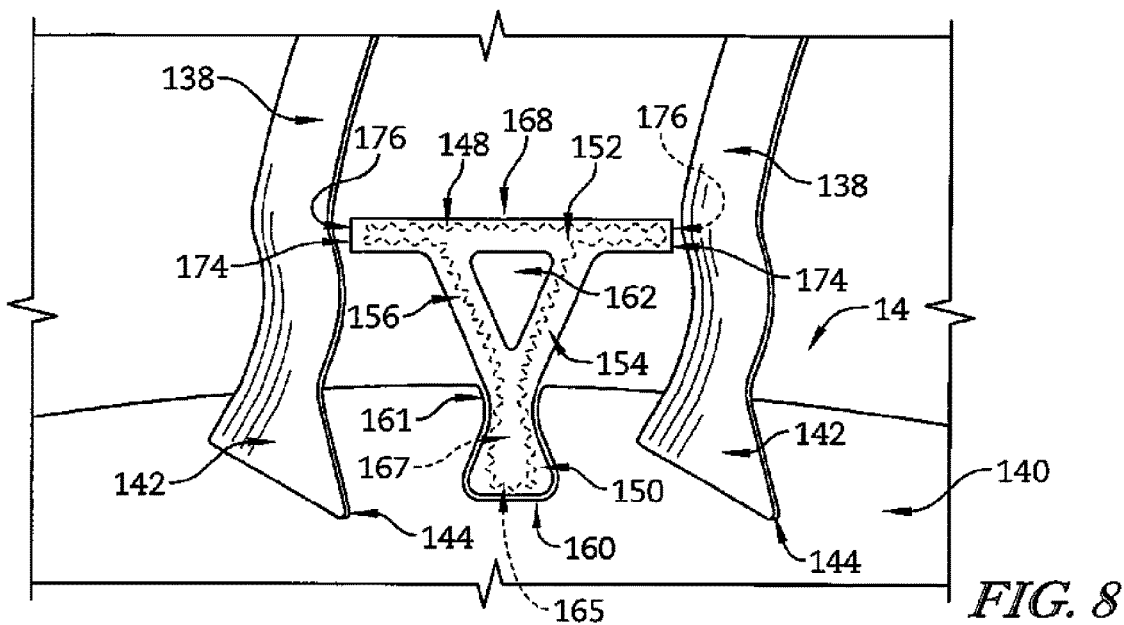
FIG. 8 is a detail end view of a fan rotor included in the FIG. 7 showing a composite annulus filler positioned between a pair of fan blades.

A fan rotor 130 illustratively comprises a plurality of radially extending blades 138 mounted on a disc 140, as shown in FIGS. 7 and 8. The blades 138 are mounted on the disc 140 by inserting a root portion 142 of the blades 138 in a complementary retention groove 144 in the outer face 146 of the disc periphery while an airfoil portion 143 extends into a gas path 145 of the engine. To ensure a radially smooth inner surface for air to flow over as it passes across airfoil portions 143 of the blades 138, annulus fillers 148 can be used to bridge the spaces between adjacent fan blades 138. A seal between the annulus fillers 148 and the adjacent blades 138 may also be provided by resilient strips (not shown) bonded to the annulus fillers 148 adjacent the blades 138. The annulus fillers 148, like the annulus fillers 48 described above, may be manufactured from relatively lightweight materials and, in the event of damage, may be replaced independently of the blades 138.

Annulus fillers 148 may include a filler root 150, a platform 152, and a support body 154 as shown in FIG. 8. The filler root 150 may be adapted to attach the annulus filler 148 to the rotor disc 140. The platform 152 may extend between two adjacent fan blades 138 to block air from moving radially inwardly toward the root portions 142 of the blades 138. The support body 154 may extend radially inward from the platform 152 and terminating at the filler root 150. The support body 154 is formed by two side walls 156, 158 which join to the platform 152 and meet at the filler root 150 to provide the support body 154 with a V-shaped cross-section. Filler root 150 of the illustrative embodiment has a dovetail cross-sectional shape but in other embodiments may have a fir tree or other cross-sectional shape.

Platform 152 and side walls 156, 158 cooperate to define an internal cavity 162 as shown in FIG. 8. In some embodiments, the cavity 162 can be filled with a core, which provides a lightweight resilient support to the platform 152 and side walls 156, 158. Such support can absorb impact energy and help platform 152 and side walls 156, 158 retain their shape after impact deformation. The core may be made from foam or other suitable materials injected into the cavity 162.

Platform 152 may also be formed to include a machined feature 176 as suggested in FIG. 8. The feature 176 may be in the shape of a hemispherical recess formed in the longitudinal edges 172, 174 of platform 152 similar to the feature 76 of the annulus filler 48 shown in FIG. 4.

Platform 152, side walls 156, 158 and filler root 150 are illustratively formed as a unitary structure using an automated 3D braiding process to intertwine reinforcing fibers 165 of the annulus filler 148. Alternatively, a 3D weaving process can also be used to intertwine reinforcing fibers 165 of the annulus filler 148. The braided reinforcing fibers 165 form an axially extending tube arranged around the cavity 162 without axially extending seams.

More specifically, in the illustrative embodiment, the basic preform structure of reinforcing fibers 165 included in the annulus filler 148 is formed by 3D braiding or 3D weaving aramid fibers 165, which are combined with a polymer matrix material 167 to form a polymer matrix composite structure in a manner consistent with FIG. 6. In other embodiments, other polymer composites or other composites may also be used. An optional core 90 may foamed in situ in the cavity 162.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A composite annulus filler for bridging the gap between two adjacent rotor blades attached to a rim of a rotor disc of a gas turbine engine, the composite annulus filler comprising
a platform which extends between the adjacent blades and defines an airflow surface for air being drawn through the engine, and a support body extending beneath the platform and terminating in a root which, in use, extends along a groove provided in the rim of the rotor disc, the groove having a neck which prevents withdrawal of the filler root through the neck in a radially outward direction of the disc, and
the platform, support body and root are unitarily formed as a three dimensional braided structure that comprises the platform, the support body and the root, and
wherein the three dimensional braided structure is infused with a matrix to form the composite annulus filler, wherein the support body includes first and second side walls that extend from the platform to the root, wherein a cavity is formed between the first and second side walls, and wherein the three dimensional braided structure forms an axially extending tube arranged around the cavity without axially extending seams.

2. The composite annulus filler of claim 1, wherein the braid structure is formed from silicon-carbide threads.

3. The composite annulus filler of claim 2, wherein the matrix is a silicon-carbide ceramic composite.

4. The composite annulus filler of claim 1, wherein the platform includes a top side and first and second spaced apart longitudinal edges.

5. The composite annulus filler of claim 4, wherein one of the longitudinal edges of the platform include a machined feature.

6. The composite annulus filler of claim 5, wherein the machined feature is a hemispherical recess formed in the longitudinal edge of the platform.

7. A composite annulus filler comprising
a platform,
a support body extending beneath the platform, and
and a root extending beneath the support body,
wherein the platform, support body and root are unitary and formed as a three dimensional woven structure, and wherein the three dimensional woven structure forms a tube without axially extending seams and is infused with a ceramic-containing matrix to form a ceramic matrix composite.

8. The composite annulus filler of claim 7, wherein the woven structure is formed from silicon-carbide threads.

9. The composite annulus filler of claim 7, wherein the platform of the unitary body includes a top side and first and second spaced apart longitudinal edges.

10. The composite annulus filler of claim 9, wherein one of the longitudinal edges of the platform include a machined feature.

11. The composite annulus filler of claim 10, wherein the machined feature is a hemispherical recess formed in the longitudinal edge of the platform portion.

12. The composite annulus filler of claim 7, wherein the support body includes first and second side walls that extend from the platform to the filler root.

13. The composite annulus filler of claim 12, wherein a cavity is defined by the platform, the first side wall, and the second side wall and wherein the cavity at least partially defines the tube.

14. A method for forming a composite annulus filler, the method comprising
three dimensionally braiding a unitary annulus filler preform having a platform, a support body extending beneath the platform, and a root extending beneath the support body, the platform having first and second longitudinal edges, wherein the support body includes first and second side walls that extend from the platform portion to the root to form a cavity, the three dimensional braided structure forms an axially extending tube arranged around the cavity, and the tube does not include axially extending seams,
placing the unitary annulus filler preform into a transfer mold,
applying a composite matrix material to the unitary annulus filler preform to form the composite annulus filler, and
machining features into one of the first or second longitudinal edges of the platform of the composite annulus filler.

15. The method of claim 14, wherein the unitary annulus filler preform is braided from silicon-carbide fibers and the composite matrix material contains silicon-carbide and ceramic.

* * * * *